United States Patent [19]

Eckberg et al.

[11] Patent Number: 4,608,312
[45] Date of Patent: Aug. 26, 1986

[54] ULTRAVIOLET RADIATION CURABLE SILICONE RELEASE COMPOSITIONS

[75] Inventors: Richard P. Eckberg, Saratoga Springs; Richard A. Striker, Troy; Frank J. Modic, Schenectady, all of N.Y.

[73] Assignee: General Electric Company, Waterford, N.Y.

[21] Appl. No.: 757,105

[22] Filed: Jul. 19, 1985

Related U.S. Application Data

[62] Division of Ser. No. 527,299, Aug. 26, 1983, Pat. No. 4,558,147.

[51] Int. Cl.$^4$ .................. B32B 27/08; B32B 25/20; C08G 77/28; C08F 2/50
[52] U.S. Cl. .................. 428/419; 428/447; 522/13; 522/24; 522/66; 522/99; 528/30
[58] Field of Search .................. 522/99, 66, 13, 24; 428/419

[56] References Cited

U.S. PATENT DOCUMENTS

| | | | |
|---|---|---|---|
| 3,661,744 | 5/1972 | Kehr | 204/159.14 |
| 3,715,334 | 2/1973 | Karstedt | 260/46.5 |
| 3,816,282 | 6/1974 | Viventi | 204/159.13 |
| 3,873,499 | 3/1975 | Michael et al. | 260/46.5 E |
| 4,017,652 | 4/1977 | Gruber | 427/54 |
| 4,033,934 | 7/1977 | Berger | 556/427 X |
| 4,044,037 | 8/1977 | Mui et al. | 556/427 |
| 4,048,036 | 9/1977 | Prucnal | 204/159.23 |
| 4,052,529 | 10/1977 | Bokerman et al. | 428/537 |
| 4,064,027 | 12/1977 | Gant | 204/159.13 |
| 4,070,526 | 1/1978 | Colquhoun et al. | 428/537 |
| 4,107,390 | 8/1978 | Gordon et al. | 428/447 |
| 4,171,252 | 10/1979 | Fantazier | 204/159.23 |
| 4,197,173 | 4/1980 | Curry et al. | 204/159.13 |
| 4,230,816 | 10/1980 | Martin | 556/427 X |
| 4,279,717 | 7/1981 | Eckberg et al. | 204/159.13 |

*Primary Examiner*—John C. Bleutge
*Assistant Examiner*—A. H. Koeckert

[57] ABSTRACT

Novel UV-curable silicone release coating compositions and photocatalysts therefor are provided which include mercaptoalkoxyalkyl-functional polysiloxanes and vinyl-functional photoreactive terpolymers, both of which are especially compatable with certain perbenzoate ester photocatalysts. The addition of certain polyaromatic photosensitizers to enhance cure is also disclosed.

9 Claims, No Drawings

ULTRAVIOLET RADIATION CURABLE SILICONE RELEASE COMPOSITIONS

This application is a division of application Ser. No. 527,299 filed 08/26/83, now U.S. Pat. No. 4,558,447.

FIELD OF THE INVENTION

This invention relates to ultraviolet radiation-curable silicone release compositions. More particularly, it relates to new photocurable siloxane polymers and new photocatalyst-siloxane polymer combinations. Mercaptoalkoxyalkyl-functional polysiloxanes and vinyl-functional siloxane terpolymers have been discovered which are curable on exposure to ultraviolet radiation in the presence of a photoinitiator.

BACKGROUND OF THE INVENTION

Silicone compositions have become widely accepted as release coatings, which are useful to provide a surface or material which is relatively nonadherent to other materials which would normally adhere closely thereto. Silicone release compositions may be used as coatings which release pressure sensitive adhesives for labels, decorative laminates, transfer tapes, etc. Silicone release coatings on paper, polyethylene, Mylar ®, and other such substrates are also useful to provide non-stick surfaces for food handling and industrial packaging.

Previously developed silicone release products have been heat-curable, however the high energy costs and safety and environmental considerations associated with high temperature oven curing has provided the incentive for developing alternative technologies, such as ultraviolet radiation-curable silicones.

Ultraviolet (UV) radiation is one of the most widely used types of radiation because of its low cost, ease of maintenance, and low potential hazard to industrial users. Typical curing times are much shorter, and heat-sensitive materials can be safely coated and cured under UV radiation where thermal energy might damage the substrate.

Three basic UV-curable silicone systems have been developed: Epoxysilicone systems, acrylic-functional silicone systems, and mercaptofunctional silicone systems.

Epoxysilicone systems, such as those described in U.S. Pat. No. 4,279,717 (Eckberg et al.) and commonly assigned copending U.S. application Ser. No. 375,676, filed May 6, 1982, feature epoxy-functional diorgano siloxane base polymers catalyzed by onium salt photoinitiators. The compositions exhibit extremely high cure rates but depend on expensive materials which are not widely available.

Acrylic-functional silicone systems such as described in commonly assigned copending U.S. applications Ser. Nos. 239,297, filed Mar. 2, 1981, now U.S. Pat. No. 4,348,454, and 375,676, filed May 6, 1982, now U.S. Pat. No. 4,576,999 and also modified systems described in U.S. Pat. Nos. 4,048,036 (Prucnal) and 4,017,652 (Gruber), provide serviceable coatings that are UV-curable in the presence of free radical-type photoinitiators but require complex, multistep preparation.

Many mercapto-functional systems are known: For example, U.S. Pat. Nos. 4,064,027 (Gant), 4,107,390 (Gordon et al.), 4,197,173 (Curry et al.), Japan Kokai Tokkyo Koho No. 79 48,854 (to Takamizawa; Chem. Abstracts 91: 58888r, 1979), U.S. Pat. Nos. 3,661,744 (Kehr et al.), 4,070,526 (Colquhoun et al.), 4,052,529 (Bokerman et al.), 3,873,499 (Michael et al.), and 3,816,282 (Viventi) disclose mercapto-functional polysiloxane or polythiol compositions which are UV-curable when combined with an ethylenically unsaturated organic compounds, which curable compositions also contain, variously, mercaptoalkyl polysiloxane cure accelerators, acetophenone-type photosensitizers, silacyclopentenyl curing agents, cure rate accelerators and gellation inhibitors. These provide a wide range of serviceable release coating compositions, however, the acceptance of this technology has been hindered by several persistent disadvantages including dependence on scarce or expensive starting materials, unserviceably slow curing rates, complex processing, and offensive odors (associated with the mercaptan group) which persist in the cured products. Some of these specific disadvantages have been addressed, for example, in the Gant patent, photosensitizers such as acetophenone are added to assist radiation curing, in U.S. Pat. No. 4,171,252 (Fantazier), photopolymerization of unsaturated compounds is catalyzed by peroxy-napthalenic compounds, and in the aforementioned Kehr et al. and Colquhoun et al. patents aromatic ketones are employed to accelerate the cure; however, there is still a need for improvement and reduction of costs in mercaptofunctional compositions and related UV-cure technologies.

New mercaptoalkoxyalkyl-functional silicones have now been discovered which can be synthesized in a two-step, one-vessel process from readily available, inexpensive materials and which do not emit disagreeable odors. In addition, it has been discovered that certain perbenzoate esters are suitable photoinititators for polymerization reactions between mercaptofunctional compounds and vinyl-functional compounds; and the cure characteristics of the novel reactive polysiloxane/photoinitiator blends of the present invention may be enhanced or modified by certain aromatic photosensitizers or by judicious selection of the molar ratios of reactive incredients in such blends.

All of the patents and patent applications mentioned above are hereby incorporated by reference.

SUMMARY OF THE INVENTION

Accordingly, it is an object of the present invention to provide new mercaptofunctional silicone release coating compositions.

It is a further object of the present invention to provide solventless silicone release coating compositions which are curable on brief exposure to ultraviolet radiation.

It is a further object of the present invention to provide improved reactive polysiloxane/photoinitiator blends which are simply and inexpensively produced.

These and other objects are accomplished herein by a mercaptoalkoxyalkyl-functional polysiloxane capable of curing (i.e., polymerizing or crosslinking) to an abhesive polymeric composition on brief exposure to ultraviolet radiation when combined with an organic compound containing ethylenic unsaturation and a catalytic amount of a photoinitiator comprising: A diorganopolysiloxane comprising units of the formula RR'SiO, where R is hydrogen or $C_{(1-8)}$ alkyl and R' is hydrogen, $C_{(1-8)}$ alkyl or a monovalent mercaptoalkoxyalkyl-functional organic radical of from 2 to 20 carbon atoms, said diorganopolysiloxane having up to about 50% mercaptoalkoxyalkyl-functional groups and a viscosity of from about 50 to 10,000 centipoise at 25° C.

Also contemplated are mercaptoalkoxyalkyl-functional diorganopolysiloxanes prepared by (1) reacting a dialkylhydrogen-chainstopped polydialkyl-alkylhydrogensiloxane copolymer with an ω-halo-alkene in the presence of a precious metal hydrosilation catalyst, and (2) reacting the product of (1) with a hydroxy-functional thiol of the formula HO—R"—SH, where R" is a divalent alkylene or alkyl ketone radical of from 2 to 20 carbon atoms in the presence of an amine.

Another feature of the present invention is a UV-curable silicone release composition comprising:

(A) A diorganopolysiloxane comprising units of the formula RR'SiO, where R is hydrogen or $C_{(1-8)}$ alkyl and R' is hydrogen, $C_{(1-8)}$ alkyl or a monovalent mercaptoalkoxyalkyl-functional organic radical of from 2 to 20 carbon atoms, said diorganopolysiloxane having up to about 50% by weight mercaptoalkoxyalkyl groups and a viscosity of from about 50 to 10,000 centipoise at 25° C.;

(B) A polysiloxane consisting of from about 0.5 to 100 mole percent of vinyl-functional siloxane units of the formula $(CH_2=CH)R_nSiO_{3-n/2}$, where R is hydrogen or $C_{(1-8)}$ alkyl and n has a value of 0 to 2, inclusive, any non-vinyl-containing siloxane units having the formula $R^3{}_m SiO_{4-m/2}$, where $R^3$ is hydrogen or $C_{(1-8)}$ alkyl and m has a value of from 0 to 3, inclusive; and (C) A catalytic amount of a photoinitiator.

Especially contemplated are UV-curable compositions wherein the photoinitiator component is a perbenzoate ester; and further features include the use of certain aromatic ketones as photosensitizers to assist curing, and the discovery of a vinyl-functional polysiloxane terpolymer which is useful in forming UV-curable release compositions.

Further embodiments of the present invention will become apparent to those skilled in the art upon consideration of the following description, examples, and claims.

DETAILED DESCRIPTION OF THE INVENTION

The present invention provides mercaptoalkoxyalkyl-functional silicone compositions and silicone release coatings made from such compositions, as well as photoinitiators for such compositions and processes for providing the compositions and coatings.

The mercaptofunctional polymers of the present invention are diorganopolysiloxanes comprised of siloxane units having substituted groups including hydrogen atoms, lower alkyl radicals having up to about 8 carbon atoms such as methyl, ethyl, propyl, isopropyl, etc., and monovalent mercaptoalkoxyalkyl radicals of from about 2 to 20 carbon atoms. These polymers may be advantageously synthesized from a number of constituent ingredients. The relative proportions of these constituents are not critical and may be varied over a wide range to provide mercaptoalkoxyalkyl-functional polysiloxanes having varied properties. The preferred synthesis, described below, requires only two steps and may be carried out in a single reaction vessel, however it will be recognized that alterations in the synthesis procedure can be readily devised which are within the scope of the present invention.

The preferred mercaptoalkoxyalkyl-functional polymers of the present invention are prepared from a dialkylhydrogen-chainstopped polydialkyl-alkylhydrogensiloxane copolymer. Such SiH-containing polysiloxanes will ordinarily have the general formula:

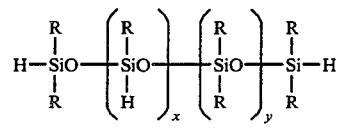

in which each R represents, independently, a monovalent alkyl radical of from 1 to 8 carbon atoms, preferably methyl, and x+y is an integer of about 25 to 600 such that the polysiloxane has a viscosity of about 20 to 5000 centipoise at 25° C., preferably 100 to 500 centipoise. Such hydrogen-functional siloxane fluids are primarily linear and will therefore have an R to Si ratio of approximately 2 to 1. These siloxane fluids will ordinarily have from about 0.5 to 50 percent by weight hydrogen-siloxy functionality and are made by processes well known in the art. Minor amounts of mono- and tri-functional siloxane units, some of which may also contain hydrogen, may also occur in these fluids but will not seriously detract from their usefulness.

The SiH-containing polysiloxanes are reacted with an ω-halo-alkene, preferably an ω-chloro-1-alkene such as allyl chloride, methallyl chloride, 4-chloro-1-butene, 10-chloro-1-decene, and other analogous unsaturated halogen-containing hydrocarbons. Mixtures of such ω-halo-alkenes will also be useful.

The alkene component and the hydrogen-functional polysiloxane component are reacted in a precious metal-catalyzed addition cure reaction. Such catalysts are well known in the silicone art and will ordinarily be a platinum metal complex effective to promote the addition of a ≡SiH moiety to the double bond of an alkene. Examples of such hydrosilation catalysts suitable for the purposes herein are described in U.S. Pat. Nos. 3,220,972 (Lamoreaux), 3,715,334 (Karstedt), 3,775,452 (Karstedt) and 3,814,730 (Karstedt), all of which are incorporated herein by reference.

The product of the hydrosilation reaction described above is finally reacted with a hydroxy-functional thiol monomer in the presence of an amine. Suitable thiols have the general formula HO—$R^3$—SH in which $R^3$ is divalent alkylene of from 2 to 20 carbon atoms or divalent alkyl ketone radicals, —$(CH_2)_n$ C:O—, of from 2 to 20 carbon atoms. Preferred compounds are β-mercaptoethanol and γ-mercaptopropionic acid. For the purposes of the present invention, sufficient amounts of the hydroxy-functional thiol monomer should be used to provide a mercaptoalkoxyalkyl-functional polysiloxane having from 0.5 to 50 percent by weight mercaptoalkoxyalkyl siloxy functionality. The above-described synthesis may be illustrated as follows:

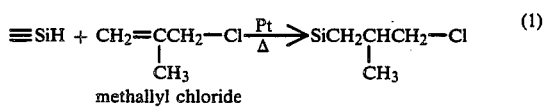
(1)

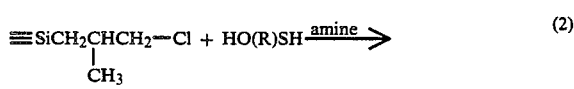
(2)

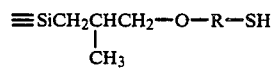

R is preferably

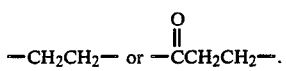

$$-CH_2CH_2- \text{ or } -\overset{\overset{O}{\|}}{C}CH_2CH_2-.$$

UV-curable mercaptoalkoxyalkyl-functional silicone compositions can be made by combining the above-described mercaptoalkoxyalkyl-functional polysiloxanes with a catalytic amount of a photoinitiator. Any of the numerous photocatalysts known to promote a curing, i.e., crosslinking, reaction between the mercaptofunctional group and the vinyl-functional group of a vinyl-containing crosslinking compound, many of which photocatalysts are discussed in the previously cited U.S. Patents (which are incorporated herein by reference), are suitable. Especially contemplated are the acetophenone-type photoinitiators such as dimethylhydroxyacetophenone, which is commercially obtainable under the tradename Darocure® 1173 (E.M. Chemicals, Inc.) A preferred feature of the present invention, however, stems from the discovery that certain perbenzoate esters having the general formula:

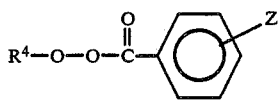

where $R^4$ is a monovalent alkyl or aryl group and Z is H, alkoxy, alkyl, halogen, nitro, amino, primary and secondary amino, amido, etc. The nature of the Z substituent will affect the stability of the peroxy bond, an electron-poor substituent stabilizing the peroxy bond, and an electron-rich substituent making the peroxy bond more reactive. These perbenzoate esters may be synthesized in known ways, such as by reacting benzoyl halides with hydroperoxides. (See, e.g., the descriptions in Blomquist and Berstein, J. Amer. Chem. Soc., 73,5546 (1951)). Preferred perbenzoate esters include t-butylperbenzoate and its para-substituted derivatives, t-butylper-p-nitrobenzoate, t-butylper-p-methoxybenzoate, t-butylper-p-methylbenzoate, and t-butylper-p-chlorobenzoate. T-butylperbenzoate is most preferred.

The amount of photoinitiator employed is not critical, so long as proper crosslinking is achieved. As with any catalyst, it is preferable to use the smallest effective amount possible; however, for purposes of illustration, catalyst levels of from about 1% to 5% by weight of the total composition have been found suitable.

In addition to the discovery that t-butylperbenzoate (and its derivatives) is an excellent photocatalyst for radical addition of mercaptofunctional siloxanes to vinyl-functional siloxanes, it has been discovered that the effectiveness of t-butylperbenzoate as a photocatalyst is considerably enhanced when it is combined with certain photosensitizers soluble in the silicone polymers of the the instant invention. The use of these photosensitizers leads to advantages in terms of release performance, ease of processing and lowering costs. The photosensitizers more than double the rate of cure in photoactive compositions under inert conditions and, suprisingly, promotes good cure without inerting, which allows important cost and processing advantages.

The photosensitizers are polyaromatic compounds having at least two benzene rings which may be fused or bridged by organic radicals or hetero-radicals such as oxa, thio, etc. Preferred among the photosensitizers tested were benzophenone and t-butylanthraquinone. Anthracene and thioxanthone were unsuccessful as photosensitizers due to their limited solubility in silicone solutions. Other photosensitizer compounds related to those already mentioned will suggest themselves to persons skilled in the art and are meant to be included within the scope of the present invention.

In the course of trials testing the effectiveness of the aforementioned perbenzoate esters and photosensitizers, previously unknown photoreactive terpolymers were discovered which are capable of curing (on exposure to UV radiation) to abhesive compositions in the presence of certain radical photosensitizers and without the use of perbenzoate esters. The terpolymers are mixed dimethylvinyl- and trimethyl-chainstopped linear polydimethyl-methylvinyl-methylhydrogen siloxane terpolymer fluids and can be synthesized by acid equilibration of methylhydrogen siloxane fluid, tetramethyl-tetravinylcyclotetrasiloxane (methylvinyltetramer) and octamethylcyclotetrasiloxane (dimethyltetramer), as described more completely in the working examples (infra).

The UV-curable silicone compositions which may be prepared from the previously described ingredients can be applied to cellulosic and other substrates including paper, metal, foil, glass, polyethylene coated kraft (PEK), supermetal, calendered kraft paper (SCK), polyethylene films, polypropylene films and polyester films. A photoinitiated reaction will cure the silicone compositions to form an abhesive surface on the coated substrate. Inerting of the cure environment, such as with nitrogen, may be desirable where the presence of oxygen is found to inhibit the curing reaction.

In order that persons skilled in the art may better understand the practice of the present invention, the following examples are provided by way of illustration, and not by way of limitation. All measurements are parts by weight.

EXAMPLES 1-10

Sample A 200 parts by weight of a 90 cps dimethylhydrogen-chainstopped linear polydimethyl-methylhydrogen siloxane fluid having about 9.5% by weight SiH-containing siloxy units (about 0.31 moles SiH total) were combined with 200 parts by weight toluene and about 31.5 parts by weight methallyl chloride (about 0.36 moles). A small amount of a platinum catalyst was added and the reaction mixture refluxed at 110° C. for 14 hours, at which time infrared examination detected no unreacted SiH functionality. Excess methallyl chloride was removed by distilling about 6 parts by weight of solvent from the mixture at one atmosphere pressure. 33 parts by weight γ-mercaptopropionic acid (0.31 moles) were added to the reaction vessel and a nitrogen atmosphere established prior to dropwise addition of 40 parts by weight triethylamine at a temperature of 35° C. A hazy percipitate (aminehydrochloride) formed as the triethylamine was added. The solvent was stripped under a vacuum (about 5 mm pressure) at 158° C. for 30 minutes. Filtering the reaction product resulted in 173 parts by weight of a hazy fluid, 250 cps viscosity.

Sample B

Another mercaptofunctional polysiloxane material was prepared in the same manner as Sample A except that β-mercaptoethanol (0.31 moles) was substituted for γ-mercaptopropionic acid. 182 parts by weight of a slightly hazy 190 cps fluid product were obtained.

Sample C 250 parts by weight of a 50 cps SiH-containing fluid similar to that used in Samples A & B containing about 6.0 percent by weight SiH-containing siloxy units (0.25 moles total SiH) were reacted with about 27 parts by weight methallyl chloride by refluxing in 250 parts by weight toluene for 16 hours in the presence of a platinum catalyst. After removal of excess methallyl chloride, 500 parts by weight hexane and 19.5 parts by weight (0.25 moles) β-mercaptoethanol were added, followed by dropwise addition of 20 parts by weight pyridine (0.26 moles) under nitrogen at 60° C. The precipitate resulting from the amine addition was filtered from the solution and the filtrate stripped of solvent and unreacted mercaptoethanol under a vacuum at 165° C. for 1½ hours. 226 parts by weight of a clear, pale yellow 130 cps product were obtained.

Sample D 250 parts by weight of a 295 cps SiH-containing fluid having about 7.0 percent by weight SiH-containing siloxy units (0.29 moles total SiH) were reacted with methallyl chloride, then β-mercaptoethanol and pyridene precisely as in the preparation of Sample C, above. Stripping the reaction product at 165° C. for 4 hours yielded 237 parts by weight of a clear, pale yellow fluid product, 830 cps viscosity.

It was noted that the prolonged strip cycle at temperatures above about 160° C. accomplished the removal of free (unreacted) mercaptoethanol (leaving an odor-free product) and the removal of residual pyridine hydrochlorate precipitate by vacuum sublimation (leaving a clear fluid product).

The mercaptoalkoxyalkyl-functional silicones produced in the above fashion were used to produce ultraviolet radiation-curable release compositions, as set forth below:

| Coating Composition 1: | 10 parts Sample B<br>1 part methylvinyltetramer (tetramethyl-tetravinyl cyclotetrasiloxane)<br>0.5 part dimethylhydroxyacetophenone (Darocure ® 1173). |
|---|---|
| Coating Composition 2: | 8 parts Sample B<br>2 parts methylvinyltetramer<br>0.5 part dimethylhydroxyacetophenone |
| Coating Composition 3: | 8 parts Sample B<br>2 parts vinyl terminated dimethylpolysiloxane fluid, 200 cps.<br>0.5 part dimethylhydroxyacetophenone. |
| Coating Composition 4: | 7 parts Sample D<br>3 parts sym-tetramethyldivinyldisiloxane<br>0.4 part dimethylhydroxyacetophenone. |
| Coating Composition 5: | 5 parts Sample D<br>3 parts sym-tetramethyldivinyldisiloxane<br>2 parts vinyl terminal dimethylmethylvinyl siloxane fluid, 200 cps<br>0.4 part dimethylhydroxyacetophenone. |

Each coating composition was coated onto 40-lb. SCK paper as a thin film with a doctor blade, then exposed to ultraviolet radiation from two focused medium-pressure mercury vapor lamps each operating at 300 watts per square inch mounted in a PPG 1202 QC-AN processor. Exposure times and curing atmosphere were varied to assess the cure performance of the experimental compositions. The cure was qualitatively determined by noting the presence or absence of smear, migration, or rub-off, with the following results:

| Coating Composition | Cure ATM | Exposure Time, Sec. | Qualitative Cure |
|---|---|---|---|
| 1 | $N_2$ | 1.5 | No smear, no migration, no rub-off |
| 1 | Air | 1.5 | Slight smear, slight migr., no rub-off |
| 1 | $N_2$ | 0.3 | No migration, easy rub-off |
| 1 | Air | 0.3 | Slight migration, easy rub-off |
| 1 | $N_2$ | 0.07 | No migration, easy rub-off |
| 1 | Air | 0.07 | Migrates, rubs off easily |
| 2 | $N_2$ | 0.3 | No migration, rubs off easily |
| 2 | Air | 0.3 | Slight migr., rubs off easily |
| 3 | $N_2$ | 0.3 | Slight migr., rubs off easily |
| 3 | Air | 0.3 | NOT CURED |
| 4 | $N_2$ | 1.5 | No smear, no migration, no rub-off |
| 4 | Air | 1.5 | Slight smear, no migration, slight rub-off |
| 5 | $N_2$ | 1.5 | No smear, no migration, no rub-off |
| 5 | Air | 1.5 | Migrates, no rub-off |
| 5 | $N_2$ | 0.3 | No migration, easy rub off |

These data indicate that a wide range of vinyl-functional siloxanes are suitable crosslinkers in the UV cure of mercaptoalkoxyalkyl-functional polysiloxanes. Also, it is apparent that better results are obtained under a nitrogen atmosphere than in air, which is predictable given the radical-initiated nature of the curing reaction. Fully cured (migration-free) coatings are observed with exposure times as brief as 1.5 seconds, although anchorage to the SCK paper (evidenced by rub-off) suffers at shorter exposure times.

It has been previously reported, in U.S. Pat. No. 4,139,385 (Crivello), incorporated herein by reference, that onium salt photocatalysts promote polyolefin-polythiol crosslinking; and the following coating compositions were prepared to test the effectiveness of cationic photocatalysts with the polymers of the present invention:

| Coating Composition 6: | 10 parts Sample B<br>1 part methylvinyltetramer<br>0.2 part $(C_{12}H_{25}Ph)_2ISbF_6$ (bis(dodecylphenyl)iodonium hexafluoroantimonate photocatalyst). |
|---|---|
| Coating Composition 7: | 10 parts Sample C<br>1 part methylvinyltetramer<br>0.5 part dimethylhydroxyacetophenone<br>0.2 part $(C_{12}H_{25}Ph)_2ISbF_6$. |
| Coating Composition 8: | 7.5 parts Sample C<br>0.5 part methylvinyltetramer<br>2 parts 1,2-epoxydodecane*<br>0.4 part dimethylhydroxyacetophenone<br>0.2 part $(C_{12}H_{25}Ph)_2ISbF_6$. |

*ω-epoxy monomer added as a cure enhancer, (described as to epoxysilicones in copending U.S. Application Serial No. 375,676 filed May 6, 1982 and incorporated herein by reference).

The performance of these compositions was tested on supercalendered kraft paper as in Examples 1–5 with the following results:

| Compo-sition | Atm. | Expo-sure, Sec. | Qualitative Cure |
|---|---|---|---|
| 6 | Air | 1.5 | No smear, no migration, no rub-off |
| 6 | $N_2$ | 0.3 | No smear, no migration, rubs-off |
| 7 | Air | 0.3 | Slight smear, no migration, some rub-off |
| 7 | $N_2$ | 0.3 | No smear, no migration, easy rub-off |
| 8 | Air | 1.5 | No smear, no migration, no rub-off |
| 8 | $N_2$ | 0.3 | No smear, no migration, easy rub-off | using the 'onium salt catalyst' in this system allows those skilled in the art to add an epoxy monomer reactive diluent (such as the linear epoxide present in Composition 8) to the vinylsiloxane-mercaptoalkoxyalkyl-siloxane mixture in order to assist anchorage or modify the release characteristics of the cured coating.

The quantitative release performance was determined for two coating compositions by preparing coating baths as follows: (The Sample compositions were dispersed in solvent in order to obtain even, low silicone depositions)

Bath 9:
  20 parts Sample B
  2 parts methylvinyltetramer
  1 part dimethylhydroxyacetophenone
  80 parts hexane.

Bath 10:
  20 parts Sample B 2 parts methylvinyltetramer 0.4 part $(C_{12}H_{25}Ph)_2ISbF_6$
  80 parts hexane.

These baths were used to coat SCK paper using a #3 wire-wound rod, and the coated papers were then exposed to UV radiation for 0.3 seconds as described above. Laminates of the cured coatings were prepared by applying a 10 mil coating of Monsanto Gelva ® 263 agressive acrylic adhesive on top of the cured silicone coating and then pressing an uncoated sheet of SCK paper onto the adhesive. 2"×9" strips of the laminates were cut, and the silicone/SCK lamina separated from the adhesive/SCK lamina at a 180° angle at 400 ft./minute in a Scott tester. The release, in grams force needed to separate the two lamina, was recorded and the following results obtained:

| Bath | Atm. | Qualitative Cure | Release grams |
|---|---|---|---|
| 9 | Air | No migr., rubs-off | 150–190 |
| 9 | $N_2$ | No migr., rubs-off | 350–450 |
| 10 | Air | (poor cure) | (not recorded) |
| 10 | $N_2$ | No migr., rubs-off | 150–210 |

Although the cured silicone release coatings did not appear to be well anchored, as evidenced by rub-off, there was no observation of the silicone layer being pulled away preferentially from the SCK substrate. The results also show a high release (as opposed to "premium" release, usually <100 grams), especially when cured in an inert atmosphere, suggesting that the radicals formed in the silicone coating interact with the acrylic monomers present in the adhesive to raise the observed release.

EXAMPLES 11 & 11A

The efficacy of t-butylperbenzoate as a photocatalyst for thiol/vinyl addition was demonstrated in the following comparative trial:

| | |
|---|---|
| Coating Composition 11: | 9.0 parts Sample D (described previously) |
| | 1.0 parts methylvinyltetramer |
| | 0.5 part t-butylperbenzoate. |
| Coating Composition 11A: | 9.0 parts Sample D |
| | 1.0 part methylvinyltetramer |
| | 0.5 parts dimethylhydroxyacetophenone (Darocure ® 1173). |

These coating compositions were hand-coated on 40-lb. supercalendered kraft paper using a doctor blade, exposed to ultraviolet light as described above, and finally qualitatively assessed for cure as a release surface, as summarized below:

| Example | Atm. | UV Exposure, sec. | Qualitative Cure |
|---|---|---|---|
| 11 | AIR | 0.6 | Slight smear, no migration, slight rub-off |
| 11 | $N_2$ | 0.3 | No smear, no migration, no rub-off |
| 11 | $N_2$ | 0.15 | No smear, no migration, slight rub off |
| 11A | AIR | 1.5 | Smears, no migration, easily rubbed-off |
| 11A | $N_2$ | 1.5 | Slight smear, no migration, slight rub-off |
| 11A | $N_2$ | 0.3 | Smears, no migration, easily rubbed-off |

From these data, it is apparent that t-butlyperbenzoate is superior to the commercially available Darocure ® 1173 photoinitiator in this curable mercapto-vinyl silicone system.

EXAMPLES 12–14 & 14A

Further investigation into the photocatalytic qualities of perbenzoate esters was conducted by preparing the following coating compositions:

| | |
|---|---|
| Coating Composition 12: | 10 parts vinyl terminal dimethyl fluid* |
| | 0.6 part trimethyl terminal methylhydrogen fluid** |
| | 0.5 part t-butylperbenzoate. |
| Coating Composition 13: | 10 parts vinyl terminal dimethyl fluid |
| | 1.0 part trimethyl terminal methylhydrogen fluid |
| | 0.5 part t-butylperbenzoate |
| | 0.5 part dimethylhydroxyacetophenone. |
| Coating Composition 14: | 10 parts vinyl-functional terpolymer[3] |
| | 0.5 part t-butylperbenzoate. |
| Coating Composition 14A: | 10 parts vinyl-functional terpolymer |
| | 0.5 part 2,5-bis(t-butylperoxy) hexane (control) |

*Dimethylvinyl terminal dimethyl polysiloxane, 200 cps viscosity fluid.
**Trimethyl terminal methyl-hydrogen polysiloxane, about 30 cps viscosity fluid.
[3]Dimethylvinyl terminal dimethyl-methylvinyl-methylhydrogen polysiloxane fluid, ratio of dimethyl:methylvinyl:methylhydrogen units equals, approximately, 88:5:6, 80 cps viscosity fluid.

Because t-butylperbenzoate may be used to promote thermally-activated crosslinking reactions, the control composition, 14A, was included in the trial. 2,5-bis(t- butylperoxy) hexane has similar thermal activity to t-butylperbenzoate, so that if the heat generated by the UV curing lamps was responsive for curing the coating compositions (instead of the ultraviolet radiation), then the curing characteristics of compositions 14 and 14A would be similar.

The cure performance in terms of exposure time required to achieve a tack-free release surface was tested by the following method:

Each mixture was applied as a thin film to 40-lb. supercalendered kraft (SCK) paper by hand with a doctor blade, then exposed to two Hanovia medium pressure mercury vapor ultraviolet lamps, each operating at 300 watts per square inch focused power, mounted in a PPG QC 1202 AN processor. The following results were observed:

| Coating Composition | Atmosphere | Tack-Free Exposure time, seconds |
|---|---|---|
| 12 | INERT | 0.9 |
| 12 | AIR | No Cure (5.0 sec.) |
| 13 | INERT | 1.5 |
| 13 | AIR | No Cure (5.0 sec.) |
| 14 | INERT | 0.3 |
| 14 | AIR | No Cure (5.0 sec.) |
| 14A | INERT | No Cure (5.0 Sec.) |
| 14A | AIR | — |

Failure of the control composition to cure even in an inert cure environment indicates that t-butylperbenzoate is a photocatalyst for a wide range of vinyl-hydrogen crosslinking reactions. The cured coating compositions also exhibited typical release surface characteristics, with no migration to Scotch ® #610 adhesive tape but with a slight tendency to smear. Poor cure in the presence of oxygen indicates the radical nature of the crosslinking reaction. It is believed that the peroxy group bonded directly to the phenyl ketone chromophore through the carbonyl carbon atom is necessary for photoactivity.

EXAMPLES 15-25

Derivatives of t-butylperbenzoate were synthesized to evaluate their performance as photocatalysts.

P-nitro Perbenzoate Derivative 33.4 parts by weight of 70% aqueous t-butylhydroperoxide were placed in a reaction vessel and cooled in an ice bath. 65 parts by weight of a 30% aqueous solution of KOH and 46.4 parts by weight of p-nitrobenzoylchloride dissolved in 90 parts by weight $CH_2Cl_2$ were simultaneously added to the vessel slowly over a 30-minute period. This reaction mixture was stirred for 2 hours at 0° C., and then for 3 hours at 25° C. The organic layer was separated from the aqueous layer, transferred to a separatory funnel and twice washed with a 5% $Na_2CO_3$ solution, thrice washed with water and finally dried over anhydrous $MgSO_4$. Removal of methylene chloride under a vacuum furnished 30.9 parts by weight of a crude yellow product, which was recrystallized from acetone/hexane to furnish yellow crystalline t-butylper-p-nitrobenzoate. This was designated $D_n$, or p-nitro derivative.

P-methoxy Perbenzoate Derivative

Synthesis of t-butylper-p-methoxybenzoate was carried out in the same manner as the p-nitro derivative. Since the product is a liquid at room temperature, purification was achieved by dissolving the crude product in $CH_3CN$, then extracting twice with hexane. The product was obtained from the acetonitrile layer by removing $CH_3CN$ under a vacuum, to give a 64% yield of a clear, pale yellow, viscous fluid. This product was designated $D_m$, or p-methoxy derivative.

P-tolyl Perbenzoate Derivative

T-butylper-p-methylbenzoate was synthesized and purified precisely as the p-methoxy derivative. Purification gave an 85% yield of a clear, colorless fluid product which was designated $D_t$, or p-tolyl derivative.

P-chloro Perbenzoate Derivative

T-butylper-p-chlorobenzoate was synthesized according to the procedure used for the p-nitro derivative. The tendency of the compound to supercool resulted in the recovery of a product with a melting point of approximately 10°-30° C., compared to 49° C. for this compound known from the literature. The solid product slowly melted at room temperature to a clear, pale yellow viscous fluid. No further effort was made to purify this sample, which was designated $D_c$, or p-chloro derivative.

In addition to the foregoing syntheses, a number of reactive silicone terpolymers were prepared by acid-catalyzed (Filtrol ® 20, acid treated clay) equilibration of trimethyl-chainstopped methylhydrogen polysiloxane, methylvinyltetramer, and dimethyltetramer. Photosensitizers were added to the terpolymers to enhance cure, according to the discovery discussed previously and demonstrated in Examples 25-56, supra. These terpolymer compositions are described below:

| | Silicone Terpolymer Compositions | | | |
|---|---|---|---|---|
| Terpolymer | Wt. % D units | Wt. % $D^H$ units | Wt. % $D^{vi}$ units | Photosensitizer Wt. % |
| A | 75.0 | 20.0 | 5.0 | AQ, 0.2 |
| B | 77.0 | 11.3 | 11.7 | BP, 2; AQ, 0.2 |
| C | 88.0 | 10.0 | 2.0 | BP, 2; AQ, 0.25 |
| D | 48.0 | 50.0 | 2.0 | BP, 2; AQ, 0.25 |
| E | 45.0 | 50.0 | 5.0 | BP, 2; AQ, 0.25 |
| F | 45.0 | 50.0 | 5.0 | BP, 3; AQ, 0.3 |

D = dimethyl siloxy units
$D^H$ = methylhydrogen siloxy units
$D^{vi}$ = methylvinyl siloxy units
AQ = 2-t-butylanthraquinone
BP = benzophenone The relative UV-curing performance of the various para-substituted perbenzoate derivatives was determined by assessing the the speed and quality of cure of a photo-sentitized silicone terpolymer combined with various perbenzoate ester photocatalysts. Low solubility of some of the perbenzoate derivatives necessitated coating and curing the compositions out of solvent.

Two coating baths were prepared, as follows:
Bath 15:
  20 pbw terpolymer C
  80 pbw hexane
  1 pbw t-butylperbenzoate
Bath 16:
  20 pbw terpolymer C
  80 pbw hexane
  1 pbw $D_n$.

The coating mixtures were applied to SCK substrates with a #3 wire-wound rod. Coated samples were exposed to ultraviolet lamps as 600 watts per square inch under inert conditions in a PPG QC 1202 AN processor as previously described until smear- and migration-free abhesive surfaces were obtained. The unsubstituted perbenzoate-catalyzed composition (No. 15) cured after 0.6 seconds UV exposure; the $D_n$-containing composition required 5.0 seconds UV exposure for the same degree of cure.

Another set of coating baths were prepared as follows:

| Baths | Terpolymer | Perbenzoate Derivative |
|---|---|---|
| 17 | D | $D_t$, 5 Wt. % |
| 18 | D | $D_m$, 5 Wt. % |
| 19 | D | $D_c$, 5 Wt. % |
| 20 | D | Control, 5 Wt. % |

Control = t-butylperbenzoate (unsubstituted)

Of these solventless compositions, only the p-methoxy derivative, $D_m$, formed an opaque mixture in terpolymer D, the other mixtures remained clear. The compositions were hand-coated on SCK substrates with a doctor blade, then cured under inert and ambient (air) environments as in Examples 15 & 16, to give the following results:

Minimum UV Exposure Required for Cure

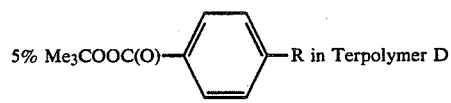

5% Me₃COOC(O)—⟨ ⟩—R in Terpolymer D

| Derivative | R | Atm. | Cure time, sec. |
|---|---|---|---|
| Control | H | AIR | 1.5 |
| Control | H | INERT | 0.3 |
| $D_c$ | Cl | AIR | 1.5 |
| $D_c$ | Cl | INERT | 0.3 |
| $D_t$ | Me | AIR | 0.6 |
| $D_t$ | Me | INERT | 0.15 |
| $D_m$ | OMe | AIR | 0.6 |
| $D_m$ | OMe | INERT | 0.15 |

From these data is appears that the perbenzoate ester catalysts may be qualitatively ranked (in ascending oder of activity): $D_n$ (very low activity), $D_c$ roughly equal to unsubstituted t-butylperbenzoate, and $D_t$ roughly equal to $D_m$. This rank roughly corresponds to thermally-induced peroxy bond dissociation energies observed in the literature. It is believed that higher alkoxy derivatives, e.g., p-butoxy, p-ethoxy, or p-dodecyloxy, etc. might overcome the solubility problems of the p-methoxy derivative, $D_m$.

It was a further discovery during the course of these trials that the photosensitized silicone terpolymers described above were capable of photocuring to abhesive coatings without the assistance of a perbenzoate ester photoinitiator.

Solvent-free coating baths were prepared as follows:

| Bath | Composition |
|---|---|
| 21 | Terpolymer F alone (contains photosensitizers: 3 Wt. % BP and 0.3 Wt. % AQ) |
| 22 | 10 pbw terpolymer F + 0.5 pbw diethoxyacetophenone (DEAP) |
| 23 | 10 pbw terpolymer F + 0.5 pbw Trigonal ® 14 (mixture of |

| Bath | Composition |
|---|---|
| | isobutyl benzoin esters; Noury Chemical Co.) |
| 24 | 10 pbw terpolymer F + 0.5 pbw t-butylperbenzoate. |
| 25 | 10 pbw terpolymer F + 0.5 pbw DEAP + 0.5 t-butylperbenzoate. |

Baths 21-24 were clear fluids, while bath 25 was hazy and partially opaque due to the limited solubility of DEAP and t-butylperbenzoate mixtures in non-polar silicone fluids.

The baths were coated on SCK substrates and cured as in Examples 17-20, and the minimum UV exposure time until smear- and migration-free coatings were achieved was recorded

| Bath | Cure Atmosphere | Minimum UV Exposure for Cure, sec. |
|---|---|---|
| 21 | AIR | 1.5 |
| 21 | INERT | 0.6 |
| 22 | AIR | 0.3 |
| 22 | INERT | 0.3 |
| 23 | AIR | 1.5 |
| 24 | AIR | 1.3 |
| 24 | INERT | 0.15 |
| 25 | AIR | 0.3 |
| 25 | INERT | 0.3 |

These date suggest that H-abstraction from the Si-H bond by the photosensitizers is involved in the curing mechanism. Benzophenone and t-butylanthraquinone are known to produce free radicals following excitation by ultraviolet radiation in the presence of a suitable proton donor.

Combinations of photosensitizers with photo-initiators capable of generating radical pairs via unimolecular homolysis after photoexcitation are reported to be a means of minimizing oxygen quenching of radical-induced crosslinking by Gruber, U.S. Pat. No. 4,071,652 (incorporated herein by reference), and this effect is evident in comparing the performance of Baths 21 and 22, where DEAP is the photoinitiator generating radical pairs. Also noted is a synergistic effect in combining photosensitizers with perbenzoate photoinitiators, when comparing the performance of Baths 21, 24 and 25. Although solubility problems evidently interfered with the performance of Bath E, it is believed that enhanced cure will result from combinations including benzophenone, t-butylanthraquinone, DEAP and t-butylperbenzoate in a mutually compatable medium.

EXAMPLES 26-56

The following compositions were prepared to show the effect of certain polyaromatic photosensitizers:

880 parts by weight dimethyltetramer, 50 parts by weight methylvinyltetramer, 20 parts by weight of sym-tetramethyldivinyldisiloxane, and 63 parts by weight of trimethyl-chainstopped polymethylhydrogensiloxane fluid (30 cps) were blended together with 5 parts by weight of an acid clay catalyst (Filtrol ® 20), then agitated under a nitrogen atmosphere at 60° C. for 15 hours. Removing the catalyst by filtration afforded a mixed dimethylvinyl and trimethyl-chainstopped linear polydimethyl-methylvinylmethylhydrogensiloxane terpolymer fluid (70 cps), which was designated Sample G.

300 parts by weight of Sample G were stripped of light ends under a vacuum at 165° C. for 2 hours. 241 parts by weight of the product were treated with 1.2 parts by weight benzophenone and the mixture stirred at 100° C. for 30 minutes until a clear solution was obtained. The benzophenone remained in solution when the polymer was cooled to room temperature, to give a 340 cps fluid product designated Sample H.

Another terpolymer was prepared exactly as Sample G from the following materials: 1260 parts by weight dimethyltetramer, 92 parts by weight methylvinyltetramer, 15 parts by weight sym-tetramethyldivinyldisiloxane, and 150 parts by weight of the methylhydrogen fluid. Filtering and stripping the equilibrate afforded 1240 parts by weight of a 1225 cps fluid, designated Sample J.

A composition designated Sample K was prepared consisting of 0.5 weight percent solution of benzophenone in the Sample J terpolymer.

A composition designated Sample L was prepared consisting of a 1.0 weight percent solution of benzophenone in the Sample J terpolymer.

A composition designated Sample M was prepared consisting of a 2.0 weight percent solution of benzophenone in the Sample J terpolymer.

A composition designated Sample N was prepared consisting of a 4.0 weight percent solution of benzophenone in the Sample J terpolymer.

A composition designated Sample P was prepared consisting of a 0.2 weight percent solution of 2-t-butylanthraquinone in the Sample J terpolymer.

It was noted that the benzophenone was quite soluble in silicone fluids to at least 4 weight percent. The limits of solubility of the chemically similar t-butylanthraquinone have not been established, however, simple experimentation will reveal to the persons skilled in this art the useful range of solubility for this and other photosensitizers suitable for the purposes disclosed herein. Attempts to prepare 0.5 weight percent solutions of anthracene and thioxanthone in the Sample J terpolymer were unsuccessful due to their limited solubility in silicones.

Ultraviolet cure analyses were performed using Samples G-P in the following manner. Each sample was mixed with 5 weight percent p-butylperbenzoate, manually coated as thin films on 40-lb. supercalendered kraft (SCK) paper with a doctor blade, then passed through a PPG QC 1202 An ultraviolet processor (2 Hanovia medium-pressure mercury vapor UV lamps each capable of operating at 100, 200 or 300 watts per square inch focused power). The degree of cure was qualitatively assessed by noting the presence or absence of smear, migration, and rub-off in irradiated coatings. After curing the test coatings prepared from Samples G-P under various cure conditions, the following results were obtained:

| Example | Sample | Total lamp power, watts | Exposure time, seconds | Cure Atm. | Qualitative Cure |
|---|---|---|---|---|---|
| 26 | G | 600 | 0.3 | N₂ | No smear, no migration, slight rub-off |
| 27 | G | 600 | 1.5 | AIR | NOT CURED |
| 28 | H | 400 | 0.3 | N₂ | No smear, no migration, slight rub-off |
| 29 | H | 600 | 0.15 | N₂ | No smear, no migration, slight rub-off |
| 30 | H | 600 | 1.5 | AIR | No smear, no migration, no rub-off |
| 31 | J | 400 | 0.3 | N₂ | No smear, no migration, slight rub-off |
| 32 | J | 600 | 0.15 | N₂ | No smear, no migration, moderate rub-off |
| 33 | J | 600 | 0.6 | AIR | NOT CURED |
| 34 | K | 200 | 0.6 | N₂ | No smear, no migration, slight rub-off |
| 35 | K | 400 | 0.1 | N₂ | No smear, no migration, moderate rub-off |
| 36 | K | 600 | 0.08 | N₂ | No smear, no migration, easy rub-off |
| 37 | L | 200 | 0.3 | N₂ | No smear, no migration, moderate rub-off |
| 38 | L | 400 | 0.1 | N₂ | No smear, no migration, moderate rub-off |
| 39 | L | 600 | 0.08 | N₂ | No smear, no migration, easy rub-off |
| 40 | M | 100 | 0.3 | N₂ | No smear, no migration, moderate rub-off |
| 41 | M | 400 | 0.1 | N₂ | No smear, no migration, moderate rub-off |
| 42 | M | 600 | 0.6 | AIR | No smear, no migration, no rub-off |
| 43 | N | 200 | 0.3 | N₂ | No smear, no migration, moderate rub-off |
| 44 | N | 600 | 0.08 | N₂ | No smear, no migration, easy rub-off |
| 45 | N | 600 | 0.3 | N₂ | No smear, no migration, no rub-off |
| 46 | N | 600 | 0.3 | AIR | No smear, no migration, no rub-off |
| 47 | P | 200 | 0.3 | N₂ | No smear, no migration, moderate rub-off |
| 48 | P | 600 | 0.3 | N₂ | No smear, no migration, no rub-off |
| 49 | P | 600 | 0.3 | AIR | No smear, no migration, no rub-off |
| 50 | P | 600 | 0.8 | N₂ | No smear, no migration, easy rub-off |

It is apparent from these results that the presence of benzophenone or t-butylanthraquinone more than doubles the rate of cure for the photoactive compositions under inert conditions, and, surprisingly, permits good cure (at fairly fast rates) even without inerting the cure environment. The latter observation can be particularly important where the expense of providing an inert atmosphere for radiation curing is a critical concern of the particular user. The compositions anchor well to SCK substrates when UV lamps are operated at high intensity for at least 0.3 seconds exposure. Shorter exposure provides migration-free abhesive coatings which are easily rubbed off, although they are otherwise fully cured.

Several samples were next assessed for release performance against common adhesives. The following coating baths were prepared (measurements are in parts by weight):

Bath Q:
  20 pbw Sample J
  1 pbw t-butylperbenzoate
  79 pbw hexane.

Bath R:
 20 pbw Sample L
 1 pbw t-butylperbenzoate
 79 pbw hexane
Bath S:
 20 pbw Sample M
 1 pbw t-butylperbenzoate
 79 pbw hexane
Bath T:
 20 pbw Sample N
 1 pbw t-butylperbenzoate
 79 pbw hexane
Bath U:
 20 pbw Sample P
 1 pbw t-butylperbenzoate
 79 pbw hexane Each of the baths Q-U were coated onto 9"×12" sheets of SCK paper with a #3 wire-wound rod, then exposed to ultraviolet light in the PPG ultraviolet processor as previously described. The cured compositions were then coated with a 10 mil layer of Gelva ® 263 acrylic adhesive (Monsanto) and cured for 15 minutes at 65° C. An uncoated SCK sheet was then affixed to the adhesive layer. These laminates were cut into strips, and the release in grams recorded as in previous examples, with the following results:

| Example | Bath | Total lamp power, watts | Exposure, sec. | Cure Atm. | Qualitative Cure | Release, grams |
|---|---|---|---|---|---|---|
| 51 | Q | 100 | 0.3 | $N_2$ | No migration, poor anchorage | 55-80 |
| 52 | R | 100 | 0.3 | $N_2$ | No migration, poor anchorage | 50-85 |
| 53 | S | 600 | 0.3 | AIR | No migration, good anchorage | 210-250 |
| 54 | S | 100 | 0.3 | $N_2$ | No migration, good anchorage | 60-90 |
| 55 | U | 600 | 0.3 | AIR | No migration, good anchorage | 110-130 |
| 56 | U | 600 | 0.3 | $N_2$ | No migration, good anchorage | 25-40 |

Examples 51, 52 and 54 indicate that benzophenone concentration has little effect on release. Although some of the cured compositions did not appear to anchor to the substrate particularly well, the separated lamina showed no evidence that the silicone layer adhered preferentially to the aggressive Gelva ® adhesive Examples 53, 55 and 56 indicate that the nature of the curing environment does have an effect that is not evident from the previous Examples 26-50: Air cure apparently leads to a higher release than cure of the same composition in an inert environment. This difference in release suggests that varying the amount of nitrogen in the curing chamber may provide a means of controlling the release of a silicone composition. It is also apparent that a low level on anthraquinone (0.2%) is more effective than benzophenone for promoting t-butylperbenzoatecatalyzed UV cure of the vinyl-functional terpolymers of the present invention.

Because t-butylperbenzoate is thermally very stable and can be stored indefinitely at room temperature, the compositions of the present invention can be packaged and sold as 1-part systems, eliminating preparatory steps and making the compositions easier to use.

EXAMPLES 57 & 58

Higher alkoxy-substituted perbenzoate photocatalysts were synthesized to try to overcome the solubility problems encountered with the p-methoxy and p-tolyl derivatives of t-butylperbenzoate:

T-butylper-p-butoxybenzoate was synthesized by first preparing p-butoxybenzoylchloride according to the procedure described by Rohrmann and Wischniewski, Arch. Pharm., 292, 787 (1959). 29.1 parts by weight of 4-n-butoxybenzoate 4-n-butoxybenzoic acid and 71.4 parts by weight thionylchloride were mixed and agitated at 86° C. for 1 hour. The resulting clear solution was stripped of excess thionylchloride under a vacuum at 60° C., and the product isolated by vacuum distillation. 30.6 parts by weight of clear viscous fluid (b.p. 143°-147° C. 7mm) were obtained (95° yield). This product was added slowly to 18 parts by weight of 70% aqueous t-butylhydroperoxide simultaneously with 35 parts by weight of 30% aqueous potassium hydroxide (also slowly added). Reaction temperature was maintained at 0-5° C. during this addition. The p-butoxy derivative was isolated by dissolution in acetonitrile, extracting twice with hexane, and removal of the acetonitrile under a vacuum, resulting in 26.2 parts by weight of a clear, pale yellow fluid product. The infrared spectrum of the product was consistent with the structure of the p-butoxy derivative of t-butylperbenzoate.

A p-dodecyloxy derivative was prepared in the same manner as the p-butoxy derivative, using p-dodecyloxybenzoyl chloride. The final product was a viscous pale yellow liquid at room temperature, and the infrared spectrum was consistent with the structure of the p-dodecyloxy derivative.

Two silicone release coating compositions were prepared using the above derivatives by mixing 5 parts by weight of each derivative, respectively, with 100 parts by weight of a 670 cps linear polydimethyl-methylvinyl-methylhydrogen siloxane fluid with 7 weight percent methylvinylsiloxy units, 5.2 weight percent methylhydrogen siloxy units and the remainder consisting of dimethylsiloxy units. In each case, an opaque white mixture resulted. Although both compositions could be cured to smear- and migration-free release coatings on SCK substrates in 0.3 seconds UV exposure (at 600 watts/square inch), the apparent poor compatibility of these two derivatives with pure silicone terpolymer solutions suggests that they are not the catalysts of choice for solvent-free release applications.

EXAMPLES 59-63

Further trials were conducted with terpolymers prepared according to the present invention in order to assess cure characteristics and storage stability. Three new terpolymers having different Si-H/Si-vinyl ratios were prepared as in previous examples and compared with terpolymer F (see Examples 15-25):

| Example | Terpolymer | Photosensitizer | Mole Ratio Si—H/Si—vinyl |
|---|---|---|---|
| 59 | F | 3 Wt. % BP, 0.3 Wt. % AQ | 14.0 |
| 60 | X | 2 Wt. % BP | 2.80 |
| 61 | Y | 2 Wt. % BP | 1.50 |
| 62 | Z | 3 Wt. % BP | 1.00 |

BP = benzophenone
AQ = t-butylanthraquinone

The release performance of the above terpolymers was assessed as in previous examples, by preparing coating baths consisting of 20 parts by weight of a terpolymer, 0.6 pbw t-butylperbenzoate and 80 pbw hexane, applying each coating composition to SCK paper, curing under UV light at 600 watts/square inch for 0.3 seconds (inert atmosphere), and finally preparing laminates using 5-mil coatings of aggressive SBR adhesive (Coated Products, Inc. #4950) and recording the force required to separate the lamina (400 ft./minute; 180° angle). Release was tested initially and periodically after aging at 150° F. The following data resulted:

| Example | Ter-polymer | Release (grams) Initial | Release (grams) 1 day | Release (grams) 1 week | Release (grams) 2 weeks |
|---|---|---|---|---|---|
| 59 | F | 30–50 | >500 | >500 | >500 |
| 60 | X | 35–45 | 45–65 | 140–160 | 160–180 |
| 61 | Y | 35–50 | 40–60 | 85–105 | 95–120 |
| 62 | Z | 45–65 | 50–65 | 65–90 | 70–90 |

It is apparent that a large excess of unreacted Si-H functionality relative to Si-vinyl-functionality will affect release, probably due to interaction of the Si-H function with the adhesives. The data suggest that where stable release is desired, the Si-H/Si-vinyl ratio should be held at lower levels, preferably below about 2/1 for the terpolymers described herein.

A separate trial to assess storage stability of a 1-part UV-curable composition was run by preparing a coating composition using 100 pbw of Terpolymer X (containing benzophenone, 2%) blended with t-butylperbenzoate (5 pbw). The composition was split into two samples, one sample being maintained at room temperature in the dark and the other at 66° C. also in the dark. The viscosity of these blends was monitored over time to obtain an indication of storage stability. The following results were observed:

| Storage Temp. | Initial | 1 Week | 2 Weeks | 4 Weeks | 8 Weeks |
|---|---|---|---|---|---|
| 25° C. | 560 cps | 550 cps | 540 cps | 550 cps | 550 cps |
| 66° C. | 550 cps | 4370 cps | (gelled) | — | — |

These data suggest that a storage temperature below about 30° C. is recommendable to prevent cure during storage.

EXAMPLES 64 & 64A

A trial comparing the cure performance of reactive terpolymers prepared according to the present invention to conventional UV-curable, vinyl-functional systems was run as follows:

A linear polydimethyl-methylvinyl-methylhydrogen siloxane terpolymer was prepared having a molar Si-H/Si-vinyl ratio of 2.8 and including 83 weight percent dimethylsiloxy units was prepared in which 2.5 weight percent benzophenone was dissolved. A conventional UV-curable, vinyl-functional silicone blend was prepared consisting of 100 parts by weight of a 200 cps dimethylvinyl-chainstopped linear polydimethyl-methylvinyl siloxane fluid having 5.2 weight percent methylvinyl siloxy units, combined with 3 parts by weight of a 30 cps trimethyl-chainstopped linear polymethylhydrogen siloxane fluid, also containing 2.5 parts by weight benzophenone.

The cure performance of the two coating blends was qualitatively tested as described in previous examples, with the PPG ultraviolet processor operating with 400 watts/square inch total focused power. The minimum UV exposure time (seconds) to obtain a smear-and-migration-free release coating on SCK substrates was recorded:

| Composition | Curing Atm. | Exposure Time for Cure, sec. |
|---|---|---|
| 64 | $N_2$ | 0.3 |
| 64 | AIR | 1.5 |
| 64A (control) | $N_2$ | 3.0 |
| 64A (control) | AIR | No cure after 15 sec. |
| 64 + 3% t-butyl-perbenzoate | $N_2$ | 0.15 |

These data indicate that the instant terpolymer compositions are superior in cure efficiency to known vinyl-functional systems; additionally, there appears to be a synergistic effect from the combination of benzophenone and perbenzoate catalysts, allowing line speeds 20 times faster than those required to fully cure conventional coatings.

Modifications and variations in the present invention are obviously possible in light of the foregoing disclosure. For example, many polyaromatic compounds soluble in a given silicone composition and effective as photosensitizers for the purposes described herein will suggest themselves to persons of ordinary skill in this art and may be utilized advantageously with coating compositions prepared in accordance with the present disclosure. It is understood, however, that any such incidental change made in the particular embodiments of the invention are within the full intended scope of the appended claims.

What is claimed is:

1. An ultraviolet radiation-curable silicone release composition comprising:
  (A) an odor-free mercaptoalkoyalkylfunctional diorganopolysiloxane consisting essentially of units of the formula RR'SiO, wherein R is hydrogen or $C_{(1-8)}$ alkyl and R' is hydrogen, $C_{(1-8)}$ alkyl or a monovalent mercaptoalkoxyalkyl-functional organic radical of from 2 to 20 carbon atoms, said diorganopolysiloxane having up to about 50% by weight mercaptoalkoxyalkyl-functional groups and a viscosity of from about 50 to 10,000 centipoise at 25° C.;
  (B) a polysiloxane consisting of from about 0.5 to 100 mole percent of vinyl-functional siloxane units of the formula $(CH_2=CH)R_nSiO_{3-n/2}$, where R is hydrogen or $C_{(1-8)}$ alkyl and n has a value of 0 to 2, inclusive, any non-vinyl-containing siloxane units having the formula $R^3{}_mSiO_{4-m/2}$, where $R^3$ is hydrogen or $C_{(1-8)}$ alkyl and m has a value of from 0 to 3, inclusive; and
  (C) a catalytic amount of a photoinitiator.

2. A silicone release composition as defined in claim 1, wherein said photoinitiator is a perbenzoate ester having the formula,

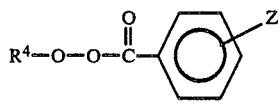

where $R^4$ is a monovalent alkyl or aryl group and Z is hydrogen, alkoxy, alkyl, halogen, nitro, amino, primary amino, secondary amino, or amido.

3. A silicone release coating composition as defined in claim 2, wherein said perbenzoate ester is selected from the group consisting of t-butylperbenzoate, t-butylper-p-nitrobenzoate, t-butylper-p-methoxy benzoate, t-butylper-p-methylbenzoate, and t-butylper-p-chlorobenzoate.

4. A silicone release coating composition as defined in claim 2, which includes the additional component (D) a small amount of a polyaromatic photosensitizer or a combination of such photosensitizers effective to enhance the cure of said composition.

5. A silicone release coating composition as defined in claim 4, wherein said photosensitizer component (D) is selected from the group consisting of benzophenone, t-butylanthraquinone, and combinations thereof.

6. A solid substrate coated on at least one surface with the composition of claim 1.

7. The coated substrate of claim 6, wherein said substrate is selected from the group consisting of paper, metal foil, glass, polyethylene coated kraft paper, supercalendered kraft paper, polyethylene film, polypropylene film and polyester film.

8. The coated substrate of claim 7, wherein said composition is cured on said substrate.

9. The coated substrate of claim 8, wherein said cured coating forms an abhesive surface on said substrate.

* * * * *